US008868392B2

(12) United States Patent
Beattie et al.

(10) Patent No.: US 8,868,392 B2
(45) Date of Patent: Oct. 21, 2014

(54) METHOD AND SYSTEM FOR PREDICTING THE EFFECT OF MICROBES INJECTED INTO AN OIL-BEARING RESERVOIR

(75) Inventors: James Garry Beattie, Ascot (GB); Andrew Stephen Davies, Poole (GB); David Arthur Puckett, Addlestone (GB); David Ramsay Thrasher, Guildford (GB)

(73) Assignee: BP Exploration Operating Company Limited, Middlesex (GB)

( * ) Notice: Subject to any disclaimer, the term of this patent is extended or adjusted under 35 U.S.C. 154(b) by 297 days.

(21) Appl. No.: 13/576,807

(22) PCT Filed: Feb. 10, 2011

(86) PCT No.: PCT/GB2011/000186
§ 371 (c)(1),
(2), (4) Date: Aug. 2, 2012

(87) PCT Pub. No.: WO2011/098770
PCT Pub. Date: Aug. 18, 2011

(65) Prior Publication Data
US 2012/0310614 A1    Dec. 6, 2012

(30) Foreign Application Priority Data

Feb. 12, 2010 (EP) .................................. 10250249

(51) Int. Cl.
*G06G 7/48* (2006.01)
*C09K 8/60* (2006.01)
*E21B 43/00* (2006.01)
*E21B 49/00* (2006.01)
*E21B 43/16* (2006.01)
*C09K 8/035* (2006.01)
*C09K 8/22* (2006.01)

(52) U.S. Cl.
CPC ................. *E21B 43/16* (2013.01); *C09K 8/602* (2013.01); *E21B 43/00* (2013.01); *E21B 49/00* (2013.01); *C09K 8/035* (2013.01); *C09K 8/22* (2013.01)
USPC ......................................................... 703/10

(58) Field of Classification Search
CPC ......... E21B 43/24; E21B 49/00; E21B 43/14; E21B 33/138; E21B 43/295; E21B 43/00; E21B 43/22; E21B 47/00; E21B 48/122; C09K 8/50; C09K 8/594; C09K 8/035; C09K 8/18; C09K 8/22; C09K 8/602; C09K 8/604; A01N 57/20; C12P 5/02; C12Q 1/04; C12Q 3/00; C12M 1/36; C12M 1/34; C12N 1/20; G06G 7/48; G06F 17/50; B09C 1/02; B09C 1/10
USPC ............. 703/10; 435/167; 506/2; 166/250.01
See application file for complete search history.

(56) References Cited

U.S. PATENT DOCUMENTS

| 4,799,545 | A | 1/1989 | Silver et al. |
|---|---|---|---|
| 7,300,973 | B2 | 11/2007 | Chang et al. |
| 2007/0181300 | A1 | 8/2007 | Busche et al. |
| 2009/0260803 | A1 | 10/2009 | Keeler et al. |
| 2010/0081184 | A1* | 4/2010 | Downey et al. ............... 435/167 |
| 2011/0308790 | A1* | 12/2011 | Strapoc et al. ........... 166/250.01 |
| 2013/0116126 | A1* | 5/2013 | Ashby et al. ...................... 506/2 |

FOREIGN PATENT DOCUMENTS

| CN | 2874021 Y | 2/2007 |
|---|---|---|
| GB | 2 222 420 A | 3/1990 |
| WO | WO 2009/129426 A2 | 10/2009 |

OTHER PUBLICATIONS

Chang et al., "Modeling of microbial transport phenomena in porous media", national Institute for Petroleum and Energy Research, Jul. 1991.*
Zekri, A.Y., et al; "Microbial and Waterflooding of Fractured Carbonate Rocks: An Experimental Approach"; SPE 75217, *Society of Petroleum Engineers*, pp. 1-10, (2002) XP002591802.
Delshad, M., et al; "Simulations of Chemical and Microbial Enhanced Oil Recovery Methods"; SPE 75237, *Society of Petroleum Engineers*, pp. 1-13 (2002) XP002591803.
Translation of Official Action in counterpart case in China (Jun. 30, 2014).

\* cited by examiner

*Primary Examiner* — Kandasamy Thangavelu
(74) *Attorney, Agent, or Firm* — Nixon & Vanderhye P.C.

(57) ABSTRACT

Method for predicting the effect of microbes injected into an oil-bearing reservoir which is capable of being represented by a first computer-generated grid including a first plurality of grid blocks. Measurement data representing the effect of injecting the microbes into a multiple coreflood apparatus is received. The multiple coreflood apparatus has material samples indicative of a rock formation associated with the oil-bearing reservoir, the samples being capable of being represented by a second computer-generated grid having a second plurality of grid blocks, the samples being representative of different regions of the reservoir and being connected such that microbes injected into the first sample are able to flow to the second sample. Data received is input into a computer-implemented reservoir model which simulates the effect of microbe injected in relation to the second grid. The reservoir model generates data indicating the effect of injecting the microbes into the multiple coreflood apparatus.

23 Claims, 10 Drawing Sheets

METHOD AND SYSTEM FOR PREDICTING THE EFFECT OF MICROBES INJECTED INTO AN OIL-BEARING RESERVOIR

This application is the U.S. national phase of International Application No. PCT/GB2011/000186 filed 10 Feb. 2011 which designated the U.S. and claims priority to European Application No. 10250249.9 filed 12 Feb. 2010, the entire contents of each of which are hereby incorporated by reference.

FIELD OF THE INVENTION

The present invention relates to a method and system for predicting the effect of microbes injected into an oil-bearing reservoir using computer-implemented modelling, based on simulating the effect of injecting the microbes into a multiple coreflood apparatus.

BACKGROUND OF THE INVENTION

It has long been known that only a portion of the total crude oil present in a reservoir can be recovered during a primary recovery process, this primary process resulting in oil being recovered under the natural energy of the reservoir. The reservoir typically takes the form of an oil-bearing subterranean rock formation having sufficient porosity and permeability to store and transmit fluids, and with which oil is associated, for example being held in pores or between grains of the rock formation. So-called secondary recovery techniques are used to force additional oil out of the reservoir, the simplest method of which is by direct replacement with another medium in the form of an injected fluid, usually water or gas. Enhanced oil recovery (EOR) techniques can also be used. The purpose of such EOR techniques is not only to restore or maintain reservoir pressure, but also to improve oil displacement in the reservoir, thereby minimising the residual oil saturation of the reservoir, that is, the volume of oil present in the reservoir.

"Waterflooding" is one of the most successful and extensively used secondary recovery methods. Water is injected, under pressure, into reservoir rock formations via injection wells. The injected water acts to help maintain reservoir pressure, and sweeps the displaced oil ahead of it through the rock towards production wells from which the oil is recovered. The water used in waterflooding is generally saline water from a natural source such as seawater or may be produced water (i.e. water that is separated from the crude oil at a production facility).

The impact of waterfloods and EOR techniques in oil reservoirs and oil fields can be monitored, and oil field operations can be managed, by acquiring data relating to selected characteristics and/or parameters of the reservoir and employing computer-implemented reservoir models to analyse the data. Interpreting and understanding the dynamics of reservoir waterflooding is of great value. Reservoirs can include complex geological layering of many rock formations, each having different properties, which can influence the flow pattern of fluid (including oil and/or injection fluid) in different ways.

In many situations, injection fluid injected during a waterflood may find a "short-circuiting" path from an injection well to a production well along high permeability pathways within the reservoir, thereby bypassing much of the oil present in the rock formation(s) of the reservoir. In order to mitigate the impact of such effects and improve the efficiency of oil recovery, polymers may be added to the waterflood injection fluid; when they mix with the water, the polymers may act as viscosifiers for the injection fluid thereby effectively partially or fully blocking the high permeability pathways and reducing the permeability of the rock locally, leading to an enhancement of the flow in the lower permeability zones, and again improving the amount of oil recovered. As disclosed in U.S. Pat. No. 7,300,973, it is also known to add polymeric microparticles to the injection fluid wherein the microparticles have labile (reversible) and non-labile internal cross links in which the microparticle conformation is constrained by the labile internal cross links. The microparticle properties, such as particle size distribution and density, of the constrained microparticle are designed to allow efficient propagation through the pore structure of hydrocarbon reservoir matrix rock. On heating to reservoir temperature and/or at a predetermined pH, the labile internal cross links start to break allowing the particle to expand by absorbing the injection fluid (normally water). The expanded particle is engineered to have a particle size distribution and physical characteristics, for example, particle rheology, which allow it to impede the flow of injected fluid in the pore structure. In doing so it is capable of diverting chase fluid into less thoroughly swept zones of the reservoir. By using either of these techniques, zones of high permeability may be blocked off deep within the reservoir, and in theory this will enable greater sweep, and hence recovery, of oil in the originally less permeable zones of the reservoir. However, the increase in viscosity of the injection fluid or the presence of polymeric particles in the injection fluid can lead to increased difficulty in injecting fluid into the reservoir rock.

It is also known to add surfactants to the waterflood injection fluid to enhance the release of oil from the surface of the rock formation by changing the wettability of the rock to the oil. Surfactants also act by emulsifying or de-emulsifying the oil.

Microbial Enhanced Oil Recovery (MEOR) techniques can also be employed to increase the amount of oil extracted from a reservoir (thereby decreasing the residual oil saturation of the reservoir rock). Microbes, and associated nutrients which feed the microbes to encourage microbial population growth, are added to an injection water and are therefore injected into the reservoir. The resulting microbial activity within the reservoir can increase oil production by a number of mechanisms, including:

(a) generation of biomass (biofilms) that result in selective blocking, and therefore a reduction in the permeability of, high permeability pathways to encourage the waterflood to sweep the originally less permeable pathways of the reservoir. Biofilms may also alter wettability of the reservoir rock to oil thereby resulting in release of adhering oil from the reservoir rock;

(b) the generation of biosurfactants that can change the oil wettability of the reservoir rock or can result in emulsification or de-emulsification of the oil and reduce interfacial tension;

(c) the generation of biopolymers that can change the injectivity profile and/or result in viscosity modification of the injected fluid thereby resulting in selective plugging of high permeability pathways in the reservoir;

(d) the generation of organic acids (for example, propionic and butyric acids) that can dissolve reservoir rock thereby increasing its permeability and can also result in the generation of surfactants by the interaction of the organic acids with metal salts that are present in the injection water or connate water;

(e) the generation of solvents (acetone, butanol, propan-2-ol) that can result in a decrease in oil viscosity;

(f) the generation of gases (hydrogen, carbon dioxide, or methane) that can result in an increase in reservoir pressure, oil swelling, or a reduction in interfacial tension and viscosity; and (g) the microbes can promote biodegradation of heavy oils into lighter oils.

MEOR is advantageous in that it is relatively inexpensive, environmentally friendly and technically relatively simple to apply; however, it can involve complex mechanisms which are difficult to monitor and assess.

Currently, laboratory coreflood testing (where a sample of rock is removed from a reservoir rock formation, before oil production begins or during primary recovery, and is then placed under the reservoir conditions for testing in the laboratory) can be applied in order to determine the residual oil saturation of the formation following a waterflood. Single coreflood experiments are well known in the crude oil recovery industry and are analysed in order to give an indication of the effect of reservoir treatments at the laboratory scale.

SUMMARY OF THE INVENTION

In accordance with a first aspect of the present invention, there is provided a method for predicting the effect of microbes injected into an oil-bearing reservoir, the oil-bearing reservoir being capable of being represented by a first computer-generated grid comprising a first plurality of grid blocks, the method comprising the steps of:

receiving measurement data representing the effect of injecting the microbes into a multiple coreflood apparatus, the multiple coreflood apparatus comprising at least first and second material samples indicative of a rock formation associated with said oil-bearing reservoir, said first and second samples being capable of being represented by a second computer-generated grid comprising a second plurality of grid blocks, the first and second samples being representative of different regions of the reservoir and being connected such that microbes injected into the first sample are able to flow to the second sample;

inputting selected data of the received measurement data into a computer-implemented reservoir model configured to simulate said effect of microbe injection in relation to the second grid;

executing the reservoir model to generate reservoir model data indicative of the effect of injecting the microbes into the multiple coreflood apparatus;

adjusting parameters of the reservoir model by matching the reservoir model data against the measurement data, in order to calibrate the reservoir model; and executing the calibrated reservoir model for the first grid to predict the effect of injecting the microbes into the reservoir.

In accordance with the above first aspect, the present invention further provides a system for predicting the effect of microbes injected into an oil-bearing reservoir, the oil-bearing reservoir being capable of being represented by a first computer-generated grid comprising a first plurality of grid blocks, the system comprising:

data receiving means arranged to receive measurement data representing the effect of injecting the microbes into a multiple coreflood apparatus, the multiple coreflood apparatus comprising at least first and second material samples indicative of a rock formation associated with said oil-bearing reservoir, and being capable of being represented by a second computer-generated grid comprising a second plurality of grid blocks, the first and second samples being representative of different regions of the reservoir and being connected such that microbes injected into the first sample are able to flow to the second sample;

a computer-implemented reservoir model configured to simulate said effect of microbe injection in relation to the second grid based on selected data of the received measurement data, and arranged to generate reservoir model data indicative of the effect of injecting the microbes into the multiple coreflood apparatus;

calibration means arranged to adjust parameters of the reservoir model by matching the reservoir model data against the measurement data, in order to calibrate the reservoir model, the calibrated model being configured to simulate said effect of microbe injection in relation to the first grid and to thereby predict the effect of injecting the microbes into the reservoir.

In accordance with a second aspect of the present invention, there is provided a method for generating data indicative of the effect of injecting microbes into an oil-bearing reservoir, the method comprising:

hydraulically connecting a first material sample, arranged to represent a first region of the reservoir, and a second material sample, arranged to represent a second region of the reservoir, in series;

injecting microbes into the first material sample; and measuring parameters of fluid flowing through the first and second material samples and/or fluid output from the second material sample, said parameters being indicative of the effect of injecting said microbes into said reservoir.

In accordance with the above second aspect, the present invention further provides an apparatus arranged to generate data indicative of the effect of injecting microbes into an oil-bearing reservoir, the apparatus comprising:

a first material sample arranged to represent a first region of the reservoir;

a second material sample arranged to represent a second region of the reservoir;

connection means for hydraulically connecting the first and second material samples in series;

injection means arranged to inject microbes into the first material sample; and measurement means arranged to measure parameters of fluid flowing through the first and second material samples and/or fluid output from the second material sample, said parameters being indicative of the effect of injecting said microbes into said reservoir.

The reservoir model data is matched against measurement data which represents the effect of injecting the microbes into a multiple coreflood apparatus, that is, one having multiple, fluidly connected rock formation samples. This apparatus gives a far more realistic interpretation of the propagation of the injected microbes between different regions of the reservoir than simply monitoring the effect of microbes injected into a single rock sample. Executing the model on the computer-generated grid representative of the reservoir therefore provides a far more accurate prediction of the effect of microbe injection in the reservoir, than that which could have been achieved based on injecting the microbes into a single coreflood apparatus.

Further features and advantages of the invention will become apparent from the following description of preferred embodiments of the invention, given by way of example only, which is made with reference to the accompanying drawings.

DETAILED DESCRIPTION OF THE INVENTION

Figure 1:
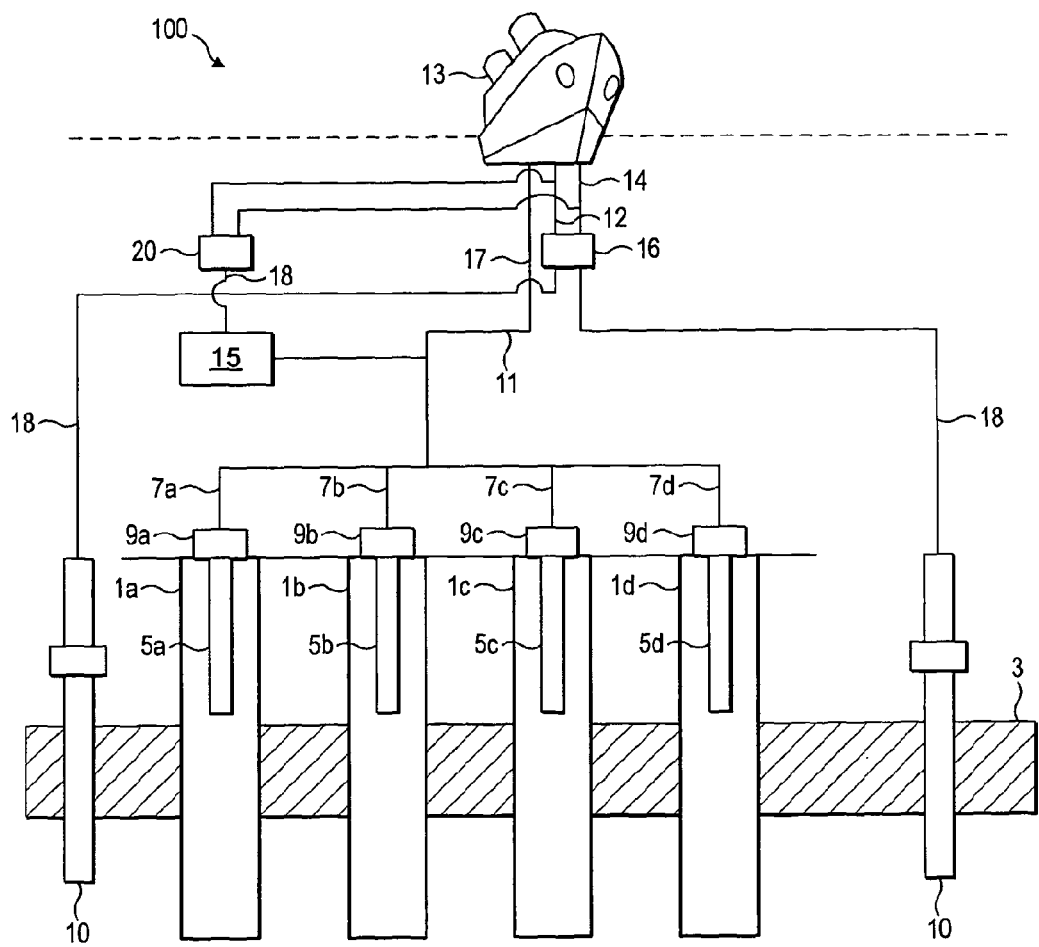
FIG. 1 is a schematic diagram showing a crude oil recovery system which is configurable in conjunction with embodiments of the invention.

FIG. 1 is a schematic block diagram showing a simplified representation of a crude oil recovery system 100 for an offshore oil field. In this Figure, a plurality of production wells 1a to 1d is used to drain at least one rock formation making up an oil reservoir 3. Each production well 1a, 1b, 1c, 1d has a production tubing 5a, 5b, 5c, 5d arranged therein and is provided with a wellhead 9a, 9b, 9c, 9d, respectively. Accordingly, the production tubing of each production well serves to transport fluids, including crude oil, produced from the reservoir 3 to the wellhead. From the wellhead 9a, 9b, 9c, 9d the produced fluids pass into a flow line 7a, 7b, 7c, 7d which connects with a main flow line 11 which transfers the produced fluids to a production facility 13 located on a platform or floating production, storage and offloading installation (FPSO) via riser 17. Moreover, an additional oil reservoir (either single or multiple oil reservoirs, each reservoir having a plurality of production wells), such as generally shown by means of part 15, may be joined to the main flow line 11. The crude oil recovery system 100 also includes at least one, preferably, a plurality of injection wells 10 for injecting an aqueous injection fluid into the rock formation of oil reservoir 3 (similarly, the additional oil reservoir(s) of part 15 are each provided with at least one injection well, preferably, a plurality of injection wells). A main injection line 12 for a pressurised injection water (such as seawater or a produced water that is separated from the crude oil at the production facility 13) extends from the production facility 13 to a subsea manifold 16 for reservoir 3. One or more further injection lines 14 may be provided if required, and it should be understood that different injection lines 12, 14 may be used to inject different injection fluids into the injection wells 10. Dedicated injection line(s) 18 extend from the subsea manifold 16 to the injection well(s) for reservoir 3. Moreover, the injection lines 12, 14 may lead to one or more additional manifold(s) 20 for each of the additional oil reservoir(s) of part 15.

Each reservoir 3 comprises at least one rock formation, which is porous and permeable, such as sandstone, and which may comprise minerals such as clays, for example a kaolinite or smectite type clay.

A crude oil displacement system of the recovery system 100 generally comprises equipment arranged to inject an injection fluid, preferably an aqueous injection fluid such as sea water, into the one or more crude oil-bearing reservoirs 3. For example, the displacement system typically comprises one or more injection fluid injection wells 10 (as shown in FIG. 1), one or more injection lines for the injection fluid, and a controller arranged to control the fluid injection. The displacement system may also comprise equipment associated with the treatment of the injection fluid in preparation for injection, such as equipment for dosing nutrients for microbes and/or microbes into the injection water. Thus, nutrients and/or microbes may be either continuously or intermittently dosed into the injection water. It is preferred to inject microbes that are indigenous to the reservoir and are therefore capable of surviving under reservoir conditions. Such microbes may be obtained from surface production facilities (for example, from separated produced water) and should be selected on the basis of their effectiveness in achieving microbial enhanced oil recovery under laboratory conditions (for example, using sandpack experiments).

The aqueous injection fluid is injected by injection equipment of the crude oil displacement system into the injection well(s) 10 thereof. The aqueous injection fluid then passes through the rock formation in which crude oil and formation water are present, resulting in displacement of the crude oil from a pore space of the rock formation. The oil can then be swept through the formation to a production well 1a to 1d spaced from the injection well 10, from which it is recovered. In the case of microbial enhanced oil recovery, the microbes tend to, at least initially, propagate in the near wellbore region of the formation or in high permeability conduits within the reservoir. However, continuous or pulsed injection of nutrients enables the microbes and microbial products (for example, biosurfactants, biopolymers, organic acids, solvents, or gases), to penetrate deeper within the formation.

Figure 2:
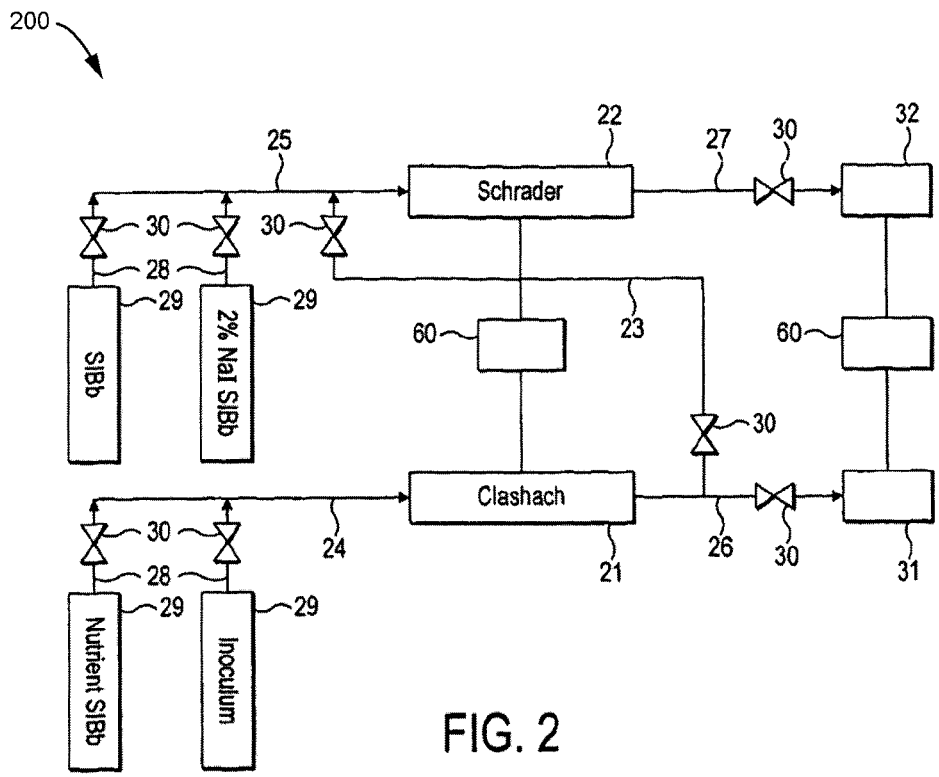
FIG. 2 shows a dual coreflood apparatus according to an embodiment of the invention.
Figure 3:
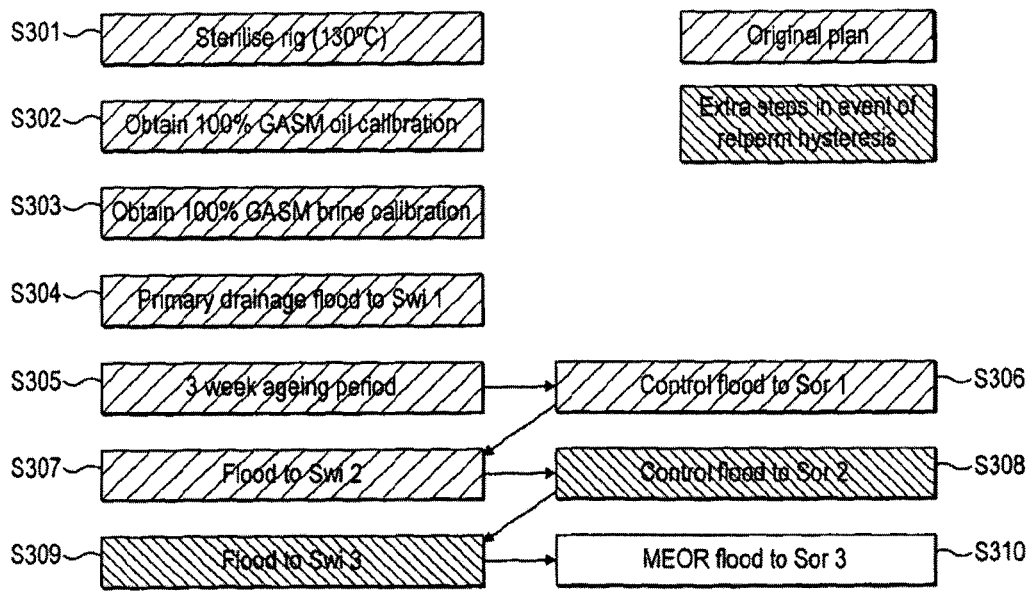
FIG. 3 shows steps carried out in preparing the dual coreflood apparatus for an injection with microbes according to a method of the invention.

FIGS. 2 and 3 are schematic representations of a dual coreflood laboratory experiment and a dual coreflood apparatus 200 which have been designed to represent the propagation of microbes through different regions of a reservoir, for example, the reservoir 3 of FIG. 1. As will be explained below, flow of fluid through the coreflood apparatus 200 can be simulated by a reservoir model using a computer-generated grid representing two rock core samples that are subject to a dual coreflood, and parameters of this model can then be scaled up and the model executed in relation to a reservoir scale, or even a field scale, computer-generated grid in order to predict the effect of the microbe injection at this larger scale. Whilst embodiments of the invention described herein are concerned with a dual coreflood experiment, it should be understood that embodiments of the invention similarly apply to coreflood apparatus comprising three or more samples of rock formations, which may be hydraulically connectable in series via two or more connection means. For example, a third material sample may be connectable to the second material sample via a second connection means. Although the laboratory experiment described herein is referred to by the term "coreflood" known in the crude oil recovery industry, it should be understood that the samples may be "core" rock samples from a reservoir of interest, or may be material samples originating elsewhere but having properties (such as chemical constituents, porosity and permeability) that are the same as, or sufficiently similar to, those of the rock formation of the reservoir of interest. Each of the first and second samples 21, 22 may be a composite of a plurality of samples placed in contact with one another, for example in the case where the samples taken are not individually sufficiently large for use in the experiment. It is also envisaged that a sandpack may be used in place of one or more of the rock core samples, in particular, a pack of a sand that has been produced from a reservoir and separated at a production facility or a pack of crushed core material.

Referring to FIG. 2, a first core 21 and a second core 22 sample of rock are provided, each sample representing a rock formation of an oil-bearing reservoir according to a process in which microbes are injected into the first sample and propagate to the second sample, as described further below. According to this process, the first core 21 is arranged to represent a "near wellbore" region of an injection well (this region typically representing between a few meters and a few hundred meters from the injection wellbore), while the second core 22 is arranged to represent a region deeper in the reservoir.

The first and second samples 21, 22 are connected in series by a connecting flow line 23 such that fluid present in the first sample 21 is capable of being injected directly into the second sample 22. Further flow lines in the form of a first injection flow line 24 and a second injection flow line 25 are provided to allow the injection of fluid into the first and second samples 21, 22, respectively. A first production flow line 26, through which effluent flows from the first core 21 and a second production flow line 27, through which effluent flows from the second core, are provided to allow fluid to flow from the first and second samples 21, 22, respectively. Various additional flow lines 28 may be provided to allow fluid injection from various injection fluid sources 29, as will be described further below, and various valves 30 are provided to control the flow of fluid in each of the flow lines. First and second measurement points 31, 32 are provided in, or at the end of, the first and second production flow lines 26, 27, respectively. Measurement equipment 60 is provided in the vicinity of each core and at each core 21, 22 and at measurement points 31, 32, and may include: gamma ray detectors positioned at suitable intervals along a length of the second core 22, and optionally, the first core 21, so as to measure, via a gamma ray attenuation signal, the residual amounts of oil and water in the second core 22, and optionally, the first core 21; one or more pressure sensors arranged to measure the absolute pressure of fluid input into and output from each of the cores, these or additional sensors being further arranged to measure a differential pressure across the length of each core; and temperature sensors to measure and monitor core and flow line temperatures. One or more pumps (not shown) arranged to inject fluid into the injection flow lines 24, 25, are controlled such that the flow rate of injected fluid and an injection fluid pressure are known.

Various "static" measurements relating to fluid and rock properties, such as the rock core 21, 22 porosities (indicating the "pore volume" of the cores 21, 22), absolute permeabilities of the cores 21, 22 and fluid (oil and water) viscosities, are also taken.

Each of the first and second samples is preferably scanned by computed tomography (CT) to identify heterogeneities, bedding planes and potential damage prior to cleaning. Once clean, the absolute injection fluid permeability $K_{w\ abs}$ and pore volume (PV) for each sample can be measured. Where the cores contain reactive clays such as smectite clays, the cores are preferably cleaned with kerosene and isopropanol as opposed to the more usual solvents, toluene and methanol so as not to artificially change the absolute permeability of the core through mobilization of the clays. The first and second samples 21, 22 are preferably placed under full reservoir conditions, that is, the pressure and temperature of the reservoir; however, during an MEOR flood, as described below in relation to FIGS. 4 and 5, the microbes injected may not be affected to any great extent by temperature and/or pressure, in which case the cores 21, 22 may be maintained at a more suitable temperature and/or pressure in the laboratory. However, it is preferred that the cores are maintained at sufficient pressure to prevent gas break-out (dissolved gas forming a separate gaseous phase in the core). The temperature of the cores 21, 22 may therefore be between 25 and 80° C. and the pressure of the cores 21, 22, between 4 and 650 bar, preferably, 10 to 200 bar. Preferably, and in the following description, the injection fluid used is, or is similar to, brine originating in the reservoir.

FIG. 3 is a flowchart of steps that are preferably taken during core preparation and the performance of a control or baseline flood, which involves flooding the rock cores 21, 22 with brine in the absence of microbes. Preferably, all equipment of the apparatus and the cores 21, 22 are sterilised (step S301), typically by heating to a nominal temperature, e.g. 130° C., for a suitable period of time, e.g. 24 hours. The apparatus and cores 21, 22 are then cooled, typically to a temperature of between approximately 25° C. and 80° C. and placed at a pressure, typically a pressure of between 4 to 650 bar, preferably, 10 to 200 bar, for example, approximately, 124 bar, and the absolute injection fluid permeability ($K_{w\ abs}$) and pore volume (PV) for each core 21, 22 are measured again.

The cores 21, 22 are prepared independently of one another. Gamma attenuation saturation monitoring (GASM) calibrations are required before performing any injection as once microbes contact the cores 21, 22, it is impossible to guarantee that they can be returned to their original state. GASM calibrations must be as accurate as possible and therefore rely on 100% of the pore space being fully saturated with fluid, and potential biofilm generation may prevent this.

Referring to FIG. 3, GASM is performed on cores 21, 22 for oil (step S302) followed by brine (step S303). The use of brine containing an iodide dopant is preferred for accurate GASM determination, but the iodide may be toxic to microbes. Therefore, iodide-doped brine is used for calibrations at the beginning of the experiment and to determine the residual oil saturation at the end thereof; information can be obtained using the GASM technique in the absence of iodide throughout the dual coreflood experiment, which will be described below with respect to FIG. 4. It should be understood that in the foregoing, the symbol $S_{wi}$ represents an irreducible brine saturation, while the symbol $S_{or}$ represents a residual oil saturation of each of the cores 21, 22.

The next step involves a primary drainage (step S304) of the cores 21, 22 to an irreducible brine saturation ($S_{wi1}$). This drainage is carried out by injecting and driving oil from the reservoir of interest, usually oil taken from the reservoir from which the core samples were obtained) through the cores 21, 22 which are initially 100% saturated with brine. The oil may be either a "dead" oil or a "live" oil that has been recombined with gas. Where the oil is a "live" oil, the gas remains in solution owing to the elevated pressure maintained in the apparatus and cores. This technique is preferably used due to the need to maintain sterility, enable GASM calibrations, and have a completely identical displacement process for a comparison with a subsequent MEOR flood. Of importance is the ability to obtain repeatable $S_{wi}$ values.

The cores 21, 22 are then aged, meaning that they are left to equilibriate, (step S305) for a suitable period, for example three weeks. During this ageing, a proportion of the water that is in contact with the surface of the rock is replaced with the oil over time, which gives a more realistic representation of the wettability of the rock for subsequent steps in the experiment. After aging, both cores undergo a first control brine flood (step S306) until measurements output from GASM measurements stabilise to give a residual oil saturation $S_{or1}$. This is the control flood for comparison with subsequent MEOR flooding.

The cores are then returned (step S307) to an irreducible brine saturation ($S_{wi2}$), again typically through oil drive. $S_{wi1}$ is then compared to $S_{wi2}$ and if they are determined to be sufficiently similar, the experiment progresses to MEOR flooding. Alternatively, the experiment may be performed without introducing oil into the first core 21, in which case the GASM oil calibration of step S302 and subsequent ageing is performed for the second core 22 only. The absence of oil in the first core 21 may be required in order to allow a sufficiently long residence time in the first core 21 for the microbes to reach an equilibrium population; any oil present in the first core 21 reduces the available pore space for the inoculum. Accordingly, the first core 21 may be 100% saturated with brine.

To ensure confidence in any observed additional oil production resulting from a comparison between the control flood and a subsequent MEOR flood (step S310), potential saturation hysteresis effects should be eliminated and thus repeatable control floods for comparison with the MEOR flood should be obtained.

A second cycle through the brine and oil flood sequence (steps S308 and S309, respectively) is performed in the event of hysteresis being observed.

The steps involved in the dual coreflood microbe injection will now be described with reference to FIG. 4. A dual coreflood is used to represent the MEOR reservoir flood because there are two phases to this type of microbial treatment—the first is an inoculation of the reservoir with microbes and a set of nutrients containing complex organics to help establish the preferred microbe types in the microbial growth region of the reservoir (typically in the near wellbore region of the injection well through which the inoculum is injected into the reservoir), and the second phase is continuous/pulsed treatment with simple nutrients (omitting the complex organics). Where a pulsed treatment is used, the injection fluid alternates between injection of an aqueous drive fluid (for example, seawater, a produced water or an aquifer water) and injection of an aqueous solution of the simple nutrients. In the reservoir environment, the first phase of the treatment is only of limited extent, while the long-term nutrient addition typically affects most of the reservoir volume owing to the microbes and chemicals generated by the microbes (for example, biosurfactants, biopolymers, organic acids, solvents and gases) moving through the reservoir thereby causing most of the incremental oil that is subsequently recovered to be released. As discussed above, the inoculum contains complex organic nutrients. The dual coreflood design therefore sweeps out the majority, preferably all, of unconsumed complex organic nutrients and active by-products together with bioproducts arising from the complex organic nutrients from the first core 21 before any fluids are allowed to enter the second core 22, which only received fluids resulting from the second phase of treatment (that omits the complex organic nutrients). Microbes and microbial by-products can then pass from the first core 21 to the second core 22.

With both cores having a starting point saturation of $S_{wi}$, the MEOR flood sequence is typically as follows. Firstly, the first core 21 is flooded (step S401) with an undoped brine via the first injection flow line 24, the brine passing through to the first production flow line 26. At this stage the valve 30 in the connecting flow line 23 is closed so that no fluid can flow between the first and second cores 21, 22. The brine injected at step S401 is undoped Simulated Injection Brine (SIBb) to remove iodide from the first core 21. A short, for example 1.5 pore volume (PV), throughput of undoped SIBb may be adequate to remove the majority of any iodide content from the first core 21.

At step S402, microbes are injected into the first core 21, again via the first injection flow line 24; this injection is also called a microbe inoculation. Typically, a 1.5 pore volume (PV) flood is performed using a pre-prepared high concentration batch of microbes. It should be understood that the brines injected at various stages and their total dissolved solids content may differ provided that none of the brines employed result in an incremental oil recovery in the absence of the microbes. Microbes alone are able to influence oil recovery; however, any sustainability and propagation of an MEOR effect may require further injections of microbes, whereas sustaining/growing the population with nutrients is more cost-effective. At step S403, the first core 21 is flooded via the first injection flow line 24 with brine containing nutrients (omitting the complex organic nutrients) until the saturation of the first core 21 reaches $S_{or}$. No further microbes are injected from this point onwards. Any residual traces of the complex organic nutrients of the inoculum together with bioproducts and microbes arising from these complex organic nutrients are flushed from the first core 21 via the first production flow line 26, and an equilibrium microbial growth zone is established in the first core 21, indicated by a constant microbe population in the effluent flowing therefrom, measured at the first measurement point 31. The first core 21 is now considered to be representative of a near well-bore region within the reservoir.

In step S404, the second core 22 is flooded with brine via the second injection flow line 25, the brine passing through to the second production flow line 27. The brine injected at step S404 is again undoped Simulated Injection Brine (SIBb) to remove iodide from the second core 22. At this stage the valve 30 in the connecting flow line 23 remains closed so that no fluid can flow between the first and second cores 21, 22; therefore, this brine flood of the second core 22 can be performed at the same time as the first core flood of step S403 (referring to FIG. 2, the fluid running through the two cores will flow in parallel), such that these two floods complete together and there is minimal delay before the start of the next phase of the process.

In step S405, the valve 30 in the connecting flow line 23 is opened and the effluent from the first core 21 is injected, or flows, into the second core 22. The effluent from the first core will comprise microbes, bioproducts produced by the microbes and any unconsumed simple nutrients. At this point, no other fluid is input into the second core 22 via the second injection flow line 25.

The second core is then "shut in" in step S406, that is, the valve 30 in the connecting flow line 23 is closed and no fluid flows in the apparatus for a predetermined or preferred period in order to increase the residence time of the first core 21 effluent within the second core 22. During this shut-in period, flooding of nutrient brine via the first injection flow line 24, into the first core 21, and out through the first production flow line 26, continues at the same flooding rate as used previously in order to maintain equilibrium microbe growth zone conditions in the first core 21.

In step S407, as in step S405, the valve 30 in the connecting flow line 23 is opened and the effluent from the first core 21 is injected, or flows, into the second core 22. Again, no other fluid is input into the second core 22 via the second injection flow line 25.

The amount of effluent that is injected into the second core 22 in steps S405 and S407 should be sufficient for core 22 to reach residual oil saturation, $S_{or2}$. Where the microbes in the second core have little impact on the absolute permeability of the core, a decrease in the differential pressure across the second core 22 is indicative of mobilisation of oil and can be used to determine when residual oil saturation, $S_{or2}$ is achieved. However, as a general rule, the amount of effluent that is injected into the second core 22 should be at least 2 PV, preferably, at least 4 PV in order to ensure that residual oil saturation has been achieved.

In step S408, the first and second cores 21, 22 are each flooded with iodide-doped brine, and the residual oil saturation $S_{or}$ of each core is measured using GASM.

Figure 4:
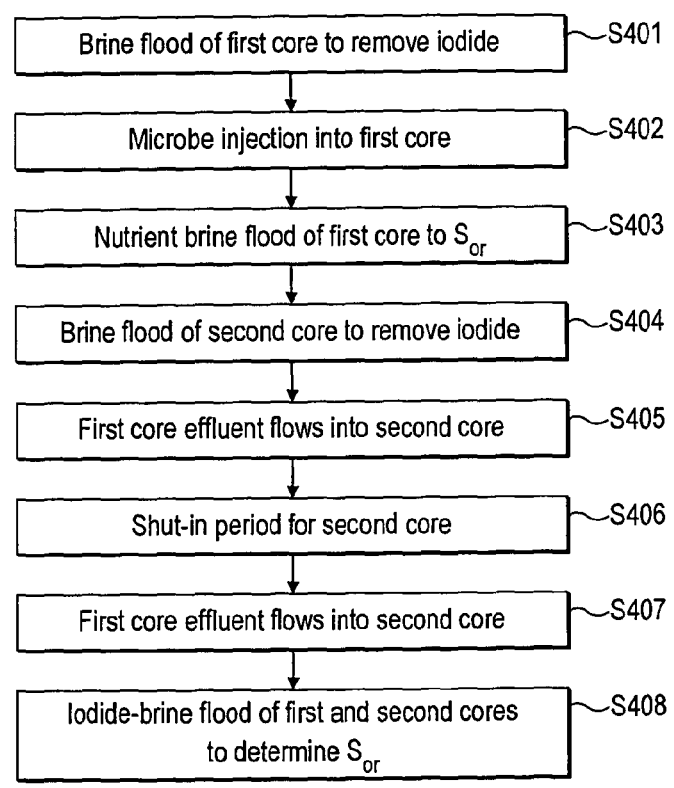
FIG. 4 shows steps carried out in performing a method for generating data indicative of the effect of injecting fluid into an oil-bearing reservoir, according to the invention.
Figure 5:
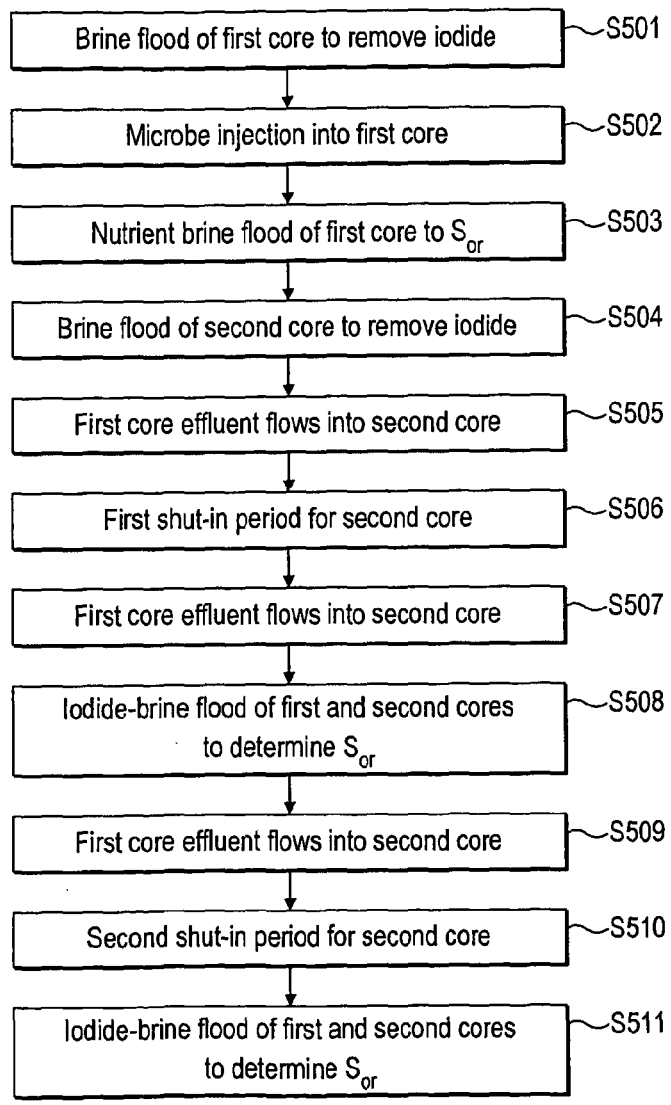
FIG. 5 shows the method of FIG. 4 including additional, optional steps.

FIG. 5 shows an optional extension of the process of FIG. 4, in which steps S501-S507 correspond to steps S401-S407. The extension provides a second shut-in period for the second core 22. To include this, the flood sequence is revised at step S507, when the second core 22 is flooded with iodide-doped brine via the second injection flow line 25, the brine passing through to the second production flow line 27. At this stage the valve 30 in the connecting flow line 23 is closed so that no fluid can flow between the first and second cores 21, 22; at the same time, flooding of nutrient brine via the first injection flow line 24, into the first core 21, and out through the first production flow line 26, continues at the same flooding rate as used previously in order to maintain equilibrium microbe growth zone conditions in the first core 21.

At step S509, the valve 30 in the connecting flow line 23 is again opened and the effluent from the first core 21 is injected, or flows, into the second core 22. Again, no other fluid is input into the second core 22 via the second injection flow line 25.

The second core 22 is then "shut in" for a second time in step S510, while flooding of the first core 21 with nutrient brine continues in order to maintain equilibrium microbe growth zone conditions in the first core 21.

Finally, at step S511, the second core 22 is flooded with iodide-doped brine, and the residual oil saturation $S_{or}$ is measured using GASM. In the case of the first core containing oil, it is also flooded with iodide-doped brine (either in series or in parallel with the second core). It should be appreciated that the final saturation profiles are only determined via GASM after completion of the coreflood i.e. once iodide-doped brine injections have been performed, to obtain accurate end-point saturations.

Throughout the experiment, real time measurements of the fluid saturations within the cores are measurable via GASM. The degree of gamma ray attenuation indicates the oil saturation in the cores 21, 22 over time, therefore providing an oil recovery profile. The differential pressure across the cores is also measured together with the pressure of the injection fluid. These measurements can provide information regarding any incremental oil recovery and the relative permeabilities of the cores to oil and water over time. Methods for determining the relative permeabilities of a core to oil and water are well known to the person skilled in the art. Such methods require measurement of the following parameters: the saturation profile (also referred to as the oil recovery profile) for the core, the fluid viscosities of the oil and brine, the porosity of the core and its pore volume, the absolute permeability of the core to either 100% oil or 100% water flowing through the core, the injection pressure, the differential pressure across the core, the temperature of the core, and the flow rate through the core. At the start of the MEOR process, at $S_{wi}$, the relative permeability of water is zero (the water is immobile) while the relative permeability of oil is at its maximum. At the end of the MEOR experiment, at $S_{or}$, the relative permeability of oil is zero (no more oil can be mobilised) and the relative permeability of water is at its maximum. Tables of relative permeabilities can be obtained for different initial water saturation, $S_{wi}$, and different end point saturations, $S_{or}$. Parameters that are measured at the coreflood apparatus comprise one or more of a microbe population count for the effluent stream from the first core, a differential pressure measurement across each core, water saturations along each core, oil saturations along each core, chemical analysis of the inoculum and the inoculum effluent from the first core, chemical analysis of the brine containing nutrients that is injected into the first core, the effluent from the first core and the effluent from the second core. In particular, the effluents are analysed for residual nutrients and for bioproducts such as acetate (produced from lactate) and nitrite (produced from nitrate). Data relating to the interfacial activity of the microbes, and data relating to the kinetics of reactions of the nutrients injected into the multiple coreflood apparatus are obtained either from published literature or experimentally. Coreflood results are matched to nutrient kinetic equations, which represent the reactions occurring in the cores and capture the influence of nutrients on microbe growth. Thus, principle chemical reactions of the nutrients that take place in the cores are determined. These chemical reactions are based on the nutrients being consumed by the microbes and the chemical products that are produced by the microbes. These chemical reactions take into account the fact that a chemical product produced by a particular microbe may be used as a nutrient by a different microbe thereby resulting in production of a different chemical product. The stoichiometries and reaction kinetics for these chemical reactions are then obtained either from published literature or experimentally.

The nutrient system may be a nitrate nutrient system where the nitrate acts as an electron acceptor. The nutrient system may also include a carbon source (for example, lactate), trace metals, trace vitamins, phosphate salts (for example, sodium phosphate) and ammonium salts (for example, ammonium chloride). The microbes may be selected from one or more microbes from the following genera: *Shewanella, Pseudomonas, Bacillus, Leuconostoc, Xanthomonas, Acinetobacter, Rhodococcus, Arthrobacter, Aureobasidium, Alcaligeness, Sclerotium, Brevibacterium, Clostridium, Zymomonas, Klebsiella, Enterobacter*, Mixed acidogens, and *Methanobacterium*. The growth of biomass (as evidenced by change in differential pressure across at least the first core in the coreflood tests) depends upon the initial microbe population in the inoculum plus the concentrations of nutrients; the biomass that grows on the surface of the rock reduces the available pore space in the rock formation and hence reduces the rock permeability. Biosurfactant concentrations (surfactants produced by the microbes) relate to both the microbe population and the various nutrient concentrations. It should be understood that the microbes may be combined with the nutrients to activate the microbes prior to any microbe injection. The active microbes may then be injected into the first core 21 and flow through to the second core 22 (using a brine injection is required) and the effects of this MEOR flood observed, without requiring a separate nutrient injection.

Figure 6:
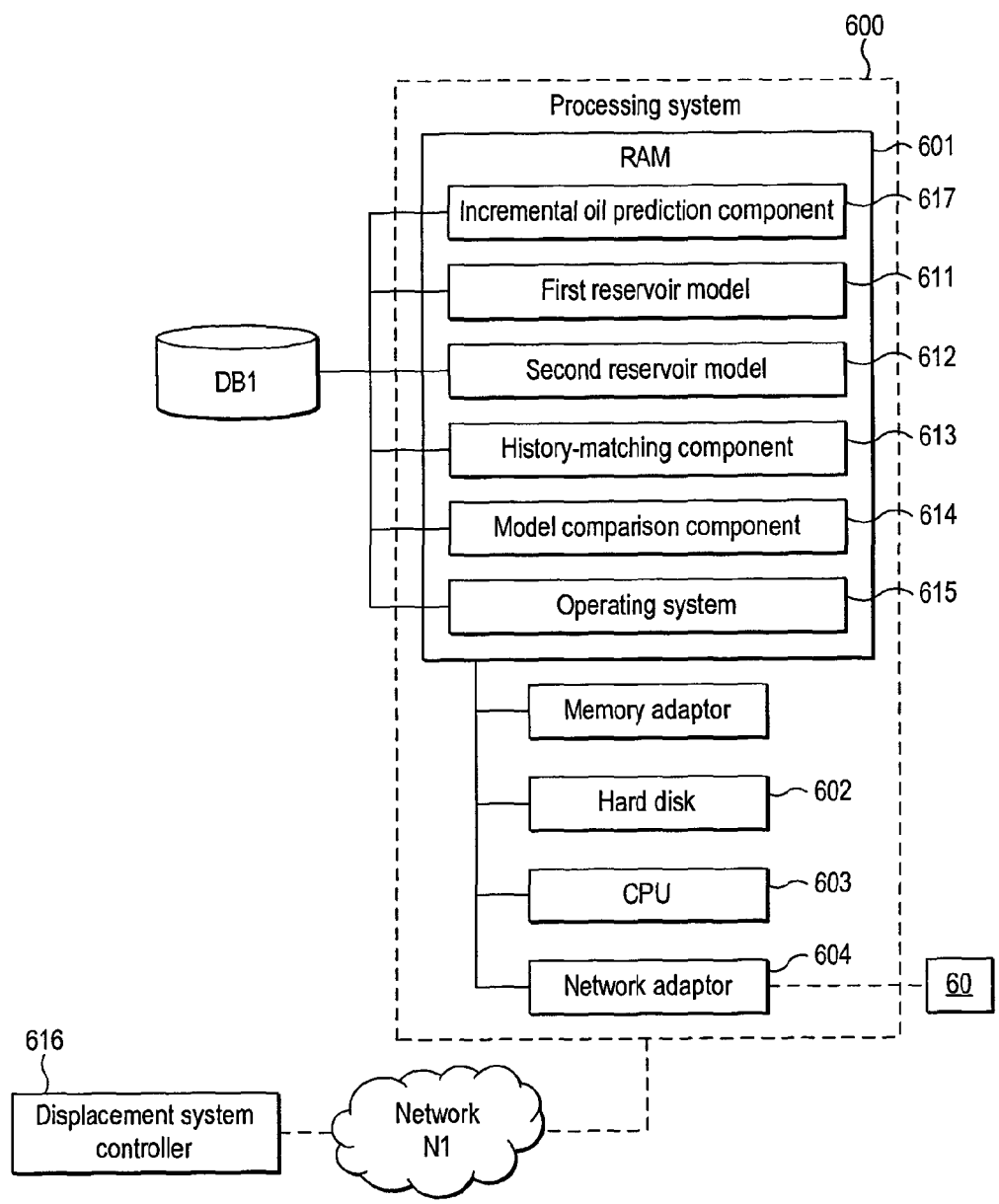
FIG. 6 shows a system for determining one or more operating modes for a crude oil displacement system of the crude oil recovery system, according to an embodiment of the present invention.

In order to predict the effects of an MEOR flood on the amount of oil recovered by the oil recovery system 100 of FIG. 1, the dual coreflood process described above is simulated by means of one or more reservoir models, as shown in FIG. 6, as will be described in detail below. A first reservoir model 611 may be employed. The reservoir model 611 is a computer program which comprises a plurality of algorithms that are typically applied to a computer-generated grid which represents the structure for which the flow is being modelled. The computer-generated grid comprises a plurality of grid blocks, and the reservoir model algorithms are performed for each grid block, the output of these computations being passed in turn to an adjacent grid block. A second reservoir model 612 may also be provided. As described below, the reservoir model(s) can, on the basis of the data resulting from the algorithms performed, predict the amount of incremental oil displaced from the reservoir rock, based on the dual coreflood experiment described above in relation to FIGS. 2 to 5; alternatively, this prediction can be performed by a separate incremental oil prediction software component or tool 617, to which reservoir model data output from the model is passed. A history-matching software component 613, used to match sets of experimental and reservoir model data, and a reservoir model comparison component 614, used to compare the outputs of different reservoir models, are also provided in the processing system 600.

In one arrangement, referring to FIG. 6, the reservoir models 611, 612, and the other software components 613-617 are executed by a processing system 600, which can comprise conventional operating system and storage components such as a system bus connecting a central processing unit (CPU) 603, a hard disk 602, a random access memory (RAM) 601, I/O and network adaptors 604 facilitating connection to user input/output devices and interconnection with other devices on a network N1. The Random Access Memory (RAM) 601 contains operating system software 615 which controls, in a known manner, low-level operation of the processing system 600. The server RAM 601 contains the models 611, 612 during execution thereof. Each model is configurable with measurement and/or predetermined data stored in one or more databases or other storage components which are operatively coupled or connected to the processing system 600; in the system of FIG. 6, a storage component DB1 can store such data relating to the first and/or second reservoir models 611, 612 and is accessible thereby, and can also store all other data for use by the other components of the system 600.

Measurement data received by receiving means of the system 600 are based on measured characteristics of a dual coreflood laboratory experiment, as explained further below. The measurement data may comprise specific measured values as directly measured by suitably positioned measurement equipment 60, as shown in FIG. 2, or ratios of values of characteristics, or may comprise values derived from a number of separate characteristic measurements, according to known techniques. Therefore, the raw measured characteristics may, if necessary or preferred, be manipulated by appropriate software, executed by the CPU 603 of the system 600, in order to generate measurement data that are suitable for inputting into the reservoir model(s) 611, 612. Such manipulation may simply comprise a measurement unit conversion or the creation of a required ratio of measured values.

Figure 7:
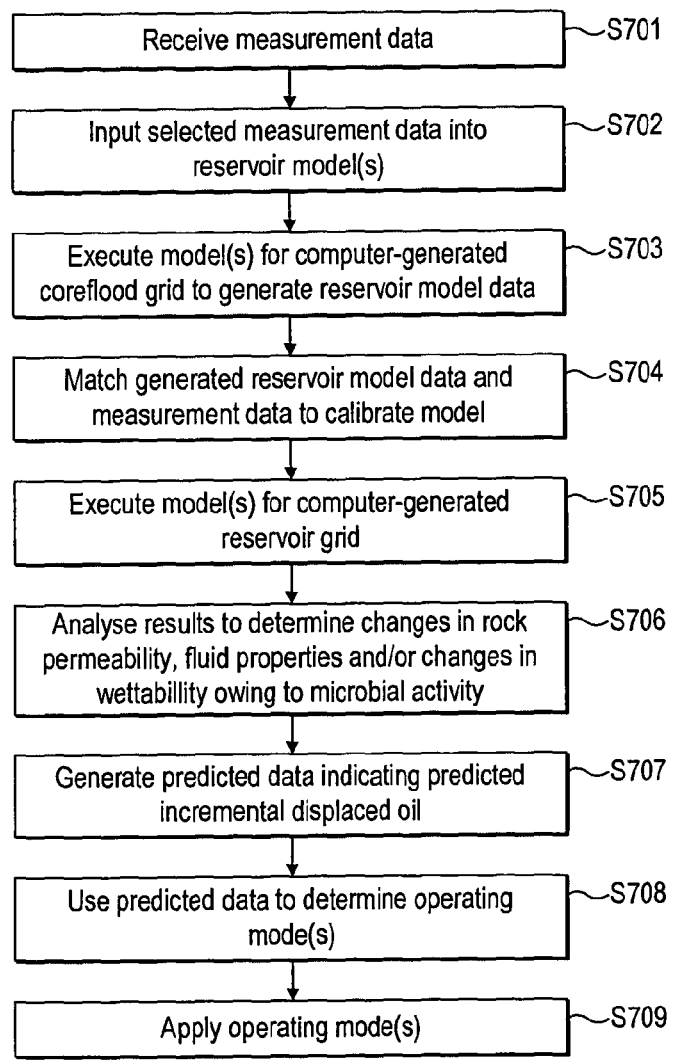
FIG. 7 shows steps carried out in performing a method for predicting the effect of microbes injected into an oil-bearing reservoir, according to the present invention.

Referring to FIG. 7, an overview of the steps involved in a first embodiment of a method for predicting the effect of microbes injected into an oil-bearing reservoir are shown.

At step S701, measurement data representing the effect of injecting the microbes into a multiple coreflood apparatus are received via measurement equipment 60 at the processing system 600. As described above, the multiple coreflood apparatus comprises at least first and second material samples indicative of a rock formation associated with the oil-bearing reservoir.

Selected data of the received measurement data are input into the first reservoir model 611 and/or the second reservoir model 612 in step S702; the use of both models will be described in detail below. Each reservoir model is able to represent the reservoir using a computer-generated grid comprising a plurality of grid blocks (referred to hereafter as a reservoir grid) which are matched to a geological model of a reservoir. Similarly, the dual coreflood apparatus can be represented by a differently configured computer-implemented grid comprising a different plurality of grid blocks (hereinafter referred to as a coreflood grid). Data representing a structure, for example a particular configuration of grid blocks, may be stored in the storage component DB1. As explained above, the first and second samples are representative of different regions of the reservoir, namely a near well-bore region and a deep reservoir region, and are connected such that microbes injected into the first sample are able to flow to the second sample.

Each of the first and second 611, 612 computer-implemented reservoir models is therefore configured to simulate the effect of microbe injection in relation to the coreflood grid. In terms of simulating the dual coreflood experiment using a computer-implemented model, as will be described further below, the dual coreflood is considered to be a single "system", much like different regions of a reservoir are when modelling a reservoir. Flow lines 24-27 in the dual coreflood apparatus can be likened to injection and production wells in a reservoir; however, in the dual coreflood apparatus, an extra pair of "wells" is present in the form of the connecting flow line 23, which acts as the outlet of the first core 21 and inlet of the second core 22 respectively. The volume of tubing between the two cores in the dual coreflood apparatus is typically very small (preferably a few milliliters), in which case it may not be explicitly included in the model.

The reservoir model 611, 612 is executed at step S703 and as a result generates reservoir model data indicative of the effect of injecting the microbes into the multiple coreflood apparatus. The type of data input into the reservoir model 611, 612 depends on the type of model and will be discussed further below.

Next, parameters of the reservoir model are adjusted at step S704 by matching the reservoir model data against the measurement data, in order to calibrate the reservoir model.

Referring again to step S704, the data sets are preferably matched by a history-matching software component or tool 613 using a history-matching technique. History-matching may make use of the control or baseline flood(s) described above in relation to FIG. 3, such that both MEOR dual coreflood(s) and control flood(s) are history-matched. Upon analysing an oil recovery profile and/or in situ fluid saturation profiles of the dual coreflood experiment and those determined by reservoir data output by the reservoir model, any incremental oil recovery owing to the injection of microbes can be determined. The recovery/saturation profiles of the dual coreflood and the reservoir model are numerically matched, together with the differential pressures across the cores, by adjusting relative permeability curves input into the reservoir model 611, 612, having injected the appropriate fluids with appropriate concentrations for appropriate times (including shut-in periods). For the MEOR treatment it is also possible to match the effluent microbe population counts and the nutrient utilisation and bioproduct generation by adjusting the reaction stoichiometries and kinetics. In the case of MEOR flooding, the derived shape of the relative permeability curves may be dependent on the kinetics of the oil release reaction. Therefore, the history-matching provides a potential range of relative permeability curves and oil release kinetics parameters which cover that uncertainty.

Parameters that are compared when matching the reservoir model data against the measurement data in order to calibrate the reservoir model, comprise one or more of a microbe population count, a differential pressure measurement across the length of each core 21, 22, water saturation, oil saturation, chemical analysis of an injection fluid associated with the injection of microbes, chemical analysis of the nutrient brine, chemical analysis of the effluent (from each core) data relating to the interfacial activity of biofilms, and data relating to the kinetics and stoichiometries of nutrient consumption and bioproduct production. The kinetics, stoichiometries and relative permeabilities that are inputted into the reservoir model are adjusted until the experimental data (chemical data, pressure data and oil/brine saturation data are a good fit with the model. For example, if the differential pressure is doubled, then the permeability has fallen by half. The change in permeability is indicative of a change in oil mobility owing to the presence of biomass.

Finally, at step S705, the calibrated model is executed for the reservoir grid. The results may then be analysed to predict the effect of injecting the microbes into the reservoir.

Predicting the effect of injecting the microbes into the reservoir may include determining changes in rock permeability, fluid properties and/or wettability/interfacial activity owing to microbial activity (step S706). Changes in rock permeability may arise owing to the production of biomass or as a result of etching of the rock by organic acids produced by the microbes. Interfacial activity may occur owing to the presence of biofilms on the rock surface or the production of biosurfactants. Changes in the fluid properties (oil viscosity) may arise owing to the production of biopolymers, solvents or gases by the microbes. This analysis and/or prediction may be performed manually or automatically by the software model 611, 612, or by a separate software component in the form of the incremental oil prediction component 617 of the processing system 600. Preferably, output from the reservoir model data is compared against a control or baseline waterflood model so as to predict the incremental oil (step S707) that will be displaced, and therefore could be recovered using an MEOR treatment as opposed to flooding in the absence of microbes. Alternatively, output from the reservoir model data can be compared against a threshold or predetermined amount of oil, which the prediction component 617 may access from the data storage component DB1. Based on predicted data generated by the model, one or more operating modes of the crude oil displacement system can be determined (step S708). For example, it may be determined whether or not it is worthwhile performing an MEOR flood in relation to a certain reservoir. The operating mode(s) can then be manually or automatically applied (step S709) to the displacement system via the displacement system controller 616.

The commercially available "STARS" (Steam, Thermal, and Advanced Processes Reservoir Simulator by Computer Modelling Group Ltd) software program may be configured to model the dual coreflood experiment in order to capture detail around the mechanisms of oil release in the MEOR flood; the model is configured to describe the reaction kinetics of the oil release process. Therefore, this model can be employed as the first software model 611 of the processing system 600 of FIG. 6, and can be executed in relation to the coreflood and reservoir grids (at steps S703 and S705 of FIG. 7, respectively) to predict the effect of an MEOR reservoir flood as described in FIG. 7.

The STARS reservoir model 611 comprises a plurality of reactions algorithms that are configured based on at least: chemical properties of oil (i.e. hydrocarbon components), water, microbes and associated nutrients present in the reservoir (where water properties are representative of the combined presence and effect of injection water, connate water and production water). Dissolved gas may also be present in the system, in which case the physical and chemical properties thereof are also taken into account by the model. The microbe properties considered include those of the injected microbes and of those grown as a result of propagation by nutrient injection. The STARS model 611 may model the injection of one or more different types of microbes, each having both planktonic and sessile components. The various chemical reactions and component concentrations are placed in an input file for the STARS model 611. Example reactions when using two types of microbes (Microbe1 and Microbe2) and a nitrate-based nutrient system are as follows:

$n1$ Microbe1+$a1$ Nitrate+$b1$ Lactate→$a1$ Nitrite+$c1$ $CO_2$+$m1$ Microbe1    Kinetics: k1

$n2$ Microbe2+$a2$ Nitrite+$b2$ Lactate→$d2$ Ammonium+ $e2$ Nitrogen+$f2$ Acetate+$c2$ $CO_2$+$g2$ $H_2O$    Kinetics: k2

BioSurf+BioWet→$x1$ BioSurf    Kinetics: k3 where n1, a1 etc represent molar concentrations, and k1, k2 etc represent reaction rates input by the input file and BioSurf and BioWet are as defined below.

Depending on the input data into the STARS model 611, a change in the viscosity of the oil may or may not be seen or considered by the model. For example, if the input file of the model includes chemical reactions that would alter the viscosity of oil, such as biodegradation of the crude oil into lighter components, the production of solvent or the production of gases, then a change in viscosity could be modelled.

In order to model the interfacial activity of the microbes with an acceptable degree of accuracy, a first chemical component representative of binding components of the oil to the surface of the rock formation, termed "BioWet", a second chemical component representative of the interfacial activity of the microbes (owing to a biosurfactant produced by the microbes or the interfacial activity of the microbes), termed "BioSurf", and a third chemical component representative of the presence of biofilm, i.e. sessile state microbes absorbed onto the rock formation, are also used to configure the model 611.

BioWet is an artificial chemical component (in that it does not represent a particular chemical) that is representative of binding components of the oil which are physically absorbed to the surface of the reservoir rock. The BioWet component therefore represents how much oil is adhered to the rock surface and trapped in the pore space of the rock, and hence also relates to wettability and residual oil saturation parameters.

The biosurfactant, represented by the BioSurf component, that is formed when the STARS model 611 runs the input reactions, interacts with the BioWet component and hence the amount of BioWet component decreases. As BioWet is removed by the biosurfactant, the model 611 calculates that more oil is released from the rock surface. BioWet acts as a "trigger"—its concentration is gradually depleted and its effect is only seen once the concentration drops below a threshold value. This threshold is used to model the fact that a certain amount of biosurfactant or certain population density of microbes may be requited before a change in wettability/interfacial activity, and hence oil release, is seen. The maximum amount of oil that can be released relates to the end point of the relative permeability curves (and the final residual oil saturation), and is also dependent on the volume of fluid injected.

One input for the STARS model is relative permeability data indicative of the relative ease with which the oil, water and gas phases in the reservoir can move through the reservoir formation rock if multiple phases are present, after accounting for viscosity, absolute permeability and pressure gradient within the reservoir. The oil saturation measurements taken by measurement equipment 60 throughout the dual coreflood experiment provide information on oil saturation over time, which can be input at step S702 into the STARS model 611 to allow a determination of the relative permeability curves over time; alternatively, the relative permeability data can be calculated manually and input into the STARS model 611 at step S702. The STARS model 611 interpolates between relative permeability curve data sets describing the interfacial effect of the microbes, as the relative permeability data used to configure the reservoir model is dependent on a concentration of the BioWet component.

The STARS model 611 also takes, as input, various reactions that will take place during an MEOR flood, such as (taking a nitrate-based nutrient system as an example) nitrate reduction, nitrite reduction, biodegradation of oil components to change viscosity, production of solvents or biopolymers that will change viscosity, biosurfactant (BioSurf) production, reactions of biosurfactant with the "wetting component" BioWet, how the produced biosurfactant interacts with BioWet thereby reducing its concentration, a threshold level of BioWet below which an MEOR effect is seen, the maximum oil released (e.g. 5% or 10%) based on the end point of the relative permeability curves (from the dual core flood test), equations describing the formation and release of biofilms and absorption of biosurfactants and biopolymers, and changes in relative permeability and absolute permeability owing to build up of biomass on the surface of the rock or through the amount of absorbed biosurfactant.

The various reactions input into the STARS model 611 include those that describe the formation and release of biofilms as well as absorption/interaction of biosurfactant and/or biopolymer. By "biofilm" is meant microbes in a sessile state (absorbed onto the rock) as opposed to in the aqueous phase. The amount of biofilm and biosurfactants that are produced will, in turn, depend on how the microbes use the nutrients that are input into the model 611. Biofilms also have an impact on wettability. Accordingly, there is a link in the model 611 between the nutrients (and their concentrations) and the release of oil from the rock surface by biofilms/biosurfactants. The model uses a "cell blockage" input reaction to describe the amount of permeability change, against absolute permeability, that occurs owing to the formation of biofilm. Data defined in the input file for the STARS model 611, such as chemical reactions, chemical parameters, mole ratios, etc may be derived from published data or may be determined experimentally, and may be stored in the storage component DB1.

Static properties relating to fluid and rock properties, such as the rock core 21, 22 porosities (indicating the "pore volume" of the cores 21, 22), absolute permeabilities of the cores 21, 22 and fluid (oil and water) viscosities, which are measured as a result of the coreflood experiment, are also input into the STARS model 611.

Once configured, the STARS model 611 is executed (step S703 of FIG. 7) for the coreflood grid to generate reservoir model data which is then is history matched to the coreflood data and results (step S704). Finally, at step S705, the calibrated STARS model 611 is executed for the reservoir grid. The results may then be analysed to predict the effect of injecting the microbes into the reservoir.

Schematic diagrams representing reactions that occur in an MEOR flood that are considered by the STARS model are shown in FIGS. 8a to 8f.

Figure 8A:
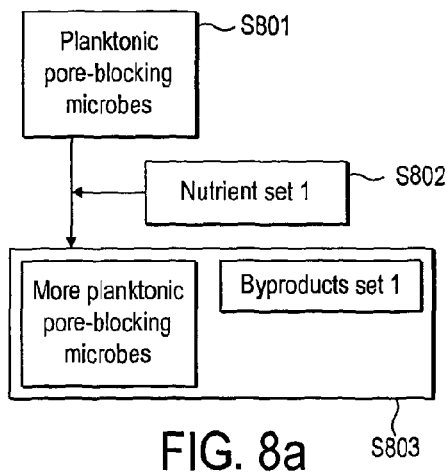
FIGS. 8a-8f are schematic diagrams of reactions simulated by a first computer-implemented model used in the method of FIG. 7.

In FIG. 8a, planktonic pore-blocking microbes present (at step S801) in fluid in the rock pore space combine (step S802) with a first set of nutrients to produce (step S803) additional planktonic pore-blocking microbes and a first set of by-products.

Figure 8B:
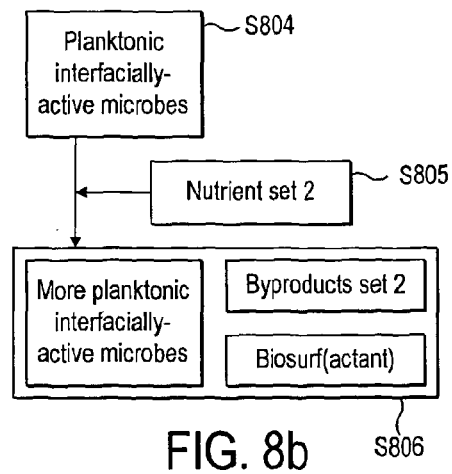

In FIG. 8b, planktonic interfacially-active microbes present (at step S804) in fluid in the rock pore space combine (step S805) with a second set of nutrients to produce (step S806) additional planktonic interfacially-active microbes, a second set of by-products and biosurfactant (BioSurf).

Figure 8C:
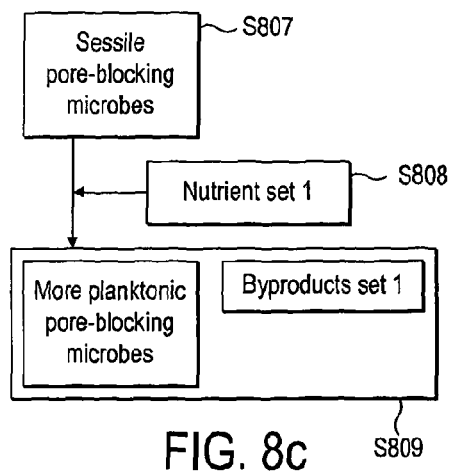

In FIG. 8c, sessile pore-blocking microbes present (at step S807) on the surface of the rock combine (step S808) with a first set of nutrients to produce (step S809) additional planktonic pore-blocking microbes in the fluid present in the rock pore space and a first set of by-products (which correspond to the same by-products as those of FIG. 8a).

Figure 8D:
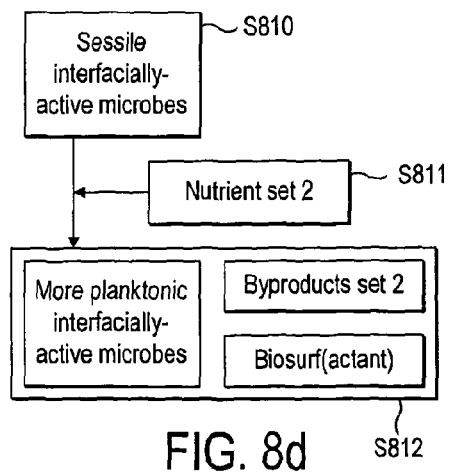

In FIG. 8d, sessile interfacially-active microbes present (at step S810) on the surface of the rock combine (step S811) with a second set of nutrients to produce (step S812) additional planktonic interfacially-active microbes, a second set of by-products and biosurfactant (BioSurf).

Figure 8E:
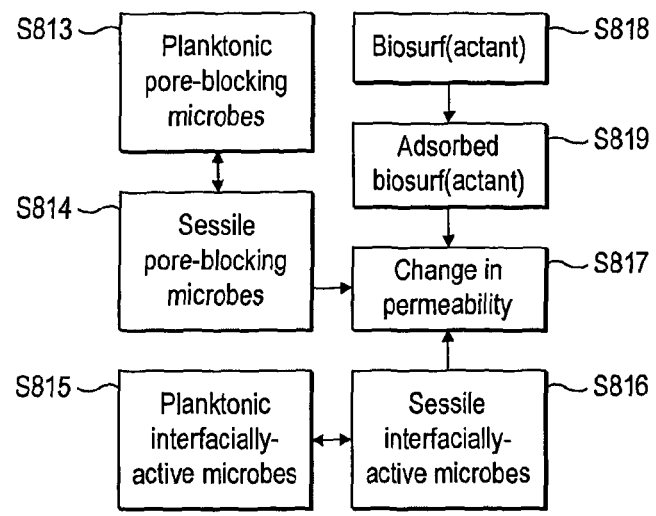

As shown in FIG. 8e, planktonic pore-blocking microbes (S813) adhere to the surface of the rock to become sessile pore-blocking microbes (S814), while planktonic interfacially-active microbes (S815) adhere to the surface of the rock to become sessile interfacially-active microbes (S816). The presence of one or both of sessile pore-blocking microbes and interfacially-active microbes results in a change in the absolute permeability of the rock (S817). Additionally, the biosurfactant present (S818), which is produced by the interfacially-active microbes in the reactions of FIGS. 8b and 8d, is adsorbed to the surface of the rock (S819), which also changes the absolute permeability of the rock at step S817.

Figure 8F:
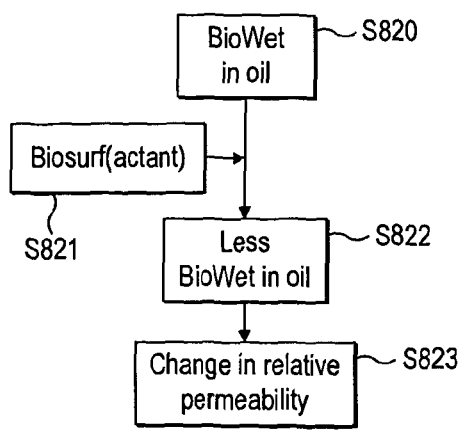

FIG. 8f shows that BioWet, the chemical component which the model uses to represent the binding components of the oil to the surface of the rock formation, is present in the oil (S820), and that this reacts with BioSurf (S821), representative of the interfacial activity of the microbes, to reduce the concentration of BioWet (S822) present in the oil, which in turn results in a change in the relative permeability (S823) of the rock to oil.

In FIGS. 8a-8f, it should be understood that planktonic microbes (i.e. those flowing in fluid) and sessile microbes (i.e. those adhered to the surface of the rock in the form of biofilm) may be the same type of microbe, but these are referred to individually so that their functions in these forms may be considered separately. Similarly, the same type of microbes may have a pore-blocking effect and be interfacially-active, but these functions are represented separately to provide a clearer explanation of the reactions involved. The second set of nutrients may, in reality, be the same type of nutrient as the first set of nutrients, however, these are distinguished by their function in FIGS. 8a-8d.

Alternatively or additionally, the commercially available "REVEAL" software program (by Petroleum Experts, Inc.) may be configured to model the dual coreflood experiment as the reservoir model of the processing system 600 of FIG. 6, and can be executed in relation to the coreflood and reservoir grids to predict the effect of an MEOR reservoir flood as described in FIG. 7. Although the STARS and REVEAL reservoirs model may be used alone or in combination with one another, the REVEAL reservoir model will be referred to hereinafter as the reservoir model 612 (i.e. the second reservoir model of FIG. 6). A schematic diagram representing the functions of the MEOR flood that are considered by the REVEAL model 612 are shown in FIG. 9. The REVEAL model 612 can be considered as a simpler but higher level model than the STARS model 611. Instead of building up the model using various reactions and input parameters, already existing polymer and surfactant components of the REVEAL model 612 are used, these components having been developed for polymer and surfactant floods respectively. In other words, the REVEAL model 612 is used for conventional polymer floods that alter permeability and conventional surfactant floods that alter wettability or change in interfacial tension. Therefore, the REVEAL model 612 uses these components to represent or "mimic" effects of the microbe population; the polymer component represents the microbe-generated biomass and the surfactant component represents the interfacial activity of the microbes. The concentration of polymer can be adjusted in the model 612 to represent the developing biomass.

Similarly, the surfactant component of the REVEAL model 612 is used to represent the biosurfactants produced by the biomass and any change in wettability owing to the presence of biofilms. Adsorption of the biosurfactant can also change permeability as well as changing wettability of the rock and surfactant absorption is a feature of the REVEAL model.

The REVEAL model 612 comprises a plurality of algorithms that are configured based on, at least: inputs relating to oil, water and gas (if applicable) components representative of properties of oil, water and gas, respectively, present in the reservoir; the polymer flood component described above; and the surfactant component described above.

Again, selected measurements in the form of the oil saturation measurements taken by measurement equipment 60 throughout the dual coreflood experiment provide information on oil saturation and differential pressure measurements over time, which are input at step S702 into the REVEAL model 612 and allow a determination of the relative permeability curves over time (provided that the model includes the previously described additional "static" properties that is required to determine the relative permeability curves); alternatively, the relative permeability data can be calculated manually and input into the REVEAL model 612 at step S702

The relative permeability data used to configure the REVEAL model 612 is dependent on an adsorption factor of the surfactant component, and any change in permeability in a grid block of the REVEAL model 612 is dependent on an adsorption factor of the polymer component. As the intention of the polymer component is to mimic the presence of the biomass, it is considered to have the same viscosity as the injection fluid. In the event that the production of a biopolymer or a solvent is modelled, a change in viscosity would be considered.

Once configured, the REVEAL model 612 is executed (step S703 of FIG. 7) for the coreflood grid to generate reservoir model data which is then history matched to the coreflood data and results (step S704). The REVEAL model inputs can therefore be modified to correlate permeability to biomass growth and the relative permeability to biosurfactant production and hence calibrate the model 612 by changing the polymer and surfactant components until there is an acceptably accurate correlation with the experimental results, i.e. the polymer and surfactant concentrations can be altered until there is a match with the differential pressure changes and the changes in oil saturations for the two core samples. Finally, at step S705, the calibrated REVEAL model 612 is executed for the reservoir grid. The results may then be analysed to predict the effect of injecting the microbes into the reservoir. The reservoir grid takes into account heterogeneity of the reservoir (fractures etc) or that the reservoir grid is based on a simple injector-producer pair. However, if sufficient computer processing is available, the REVEAL model can be executed for a reservoir grid based on an entire reservoir (multiple injector-producer pairs).

Figure 9A:
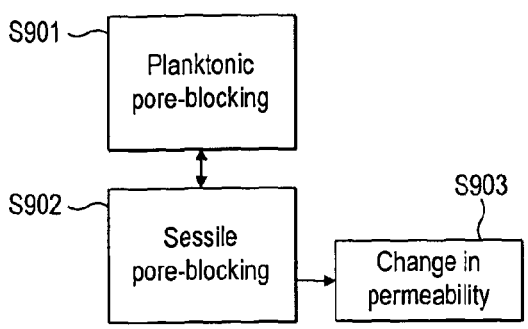
FIGS. 9a and 9b are schematic diagrams of reactions simulated by a second computer-implemented model used in addition to or as an alternative to the model of FIG. 8 in the method of FIG. 7.
Figure 9B:
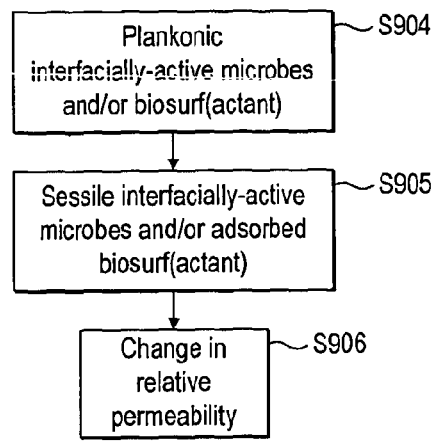

Schematic diagrams representing reactions that occur in MEOR flooding that are considered by the REVEAL model are shown in FIGS. 9a and 9b. Referring to FIG. 9a, the presence of planktonic pore-blocking biomass (S901) produces sessile pore-blocking biomass (S902), which results in a change in the absolute permeability (S903) of the rock. In FIG. 9b, the presence of planktonic interfacially-active microbes and/or biosurfactant (S904) produces sessile interfacially-active microbes and/or biosurfactant (S905), which results in a change in the relative permeability (S906) of the rock to oil.

Figure 10A:
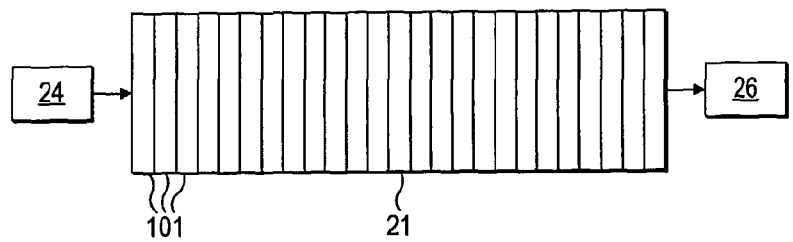
FIGS. 10a and 10b are schematic diagrams illustrating examples of computer-generated grids applied to single and dual coreflood experimental apparatus, respectively.
Figure 10B:
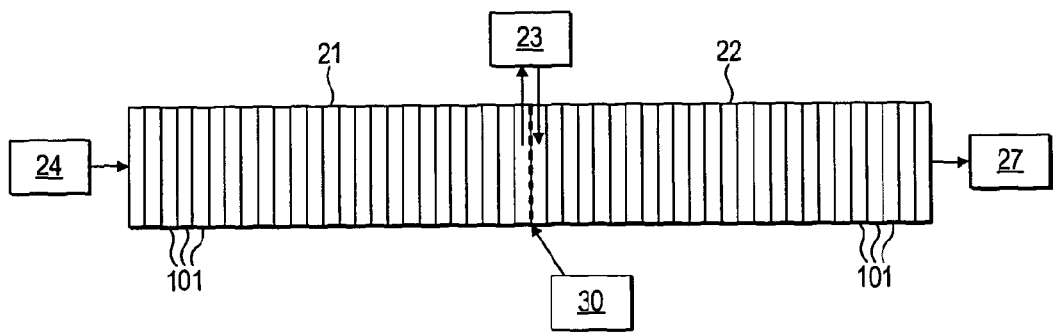

FIGS. 10a and 10b show schematic diagrams of computer-generated grids configured to represent rock core samples employed in single and dual coreflood experiments, respectively. The grids each comprise a plurality of blocks 101, which collectively represent the geometry of a geological region, such as a single core sample, a dual core sample, or a reservoir. FIG. 10a shows the first injection flow line 24 and the first production flow line 26 of the first core 21, while FIG. 10b shows the first injection flow line 24 of the first core 21, the connecting flow line 23 and associated valve 30 that hydraulically connects the first and second cores 21, 22, and the second production flow line 27 of the second core; the dual coreflood apparatus is therefore represented as a single system by the coreflood grid of FIG. 10b. A three-dimensional grid with multiple grid blocks in the x-direction, multiple grid blocks in the y-direction and multiple grid blocks in the z-direction is preferred for a computer-generated grid representing the reservoir. One or each of the reservoir model 611, 612 is executed for each of the individual grid blocks. A finer grid (i.e. smaller and therefore more densely packed grid blocks) can be used in certain areas, such as the near well-bore region, to provide a more detailed, and hence more accurate, model of this region.

The coreflood grid used for the dual coreflood experiment described with respect to FIG. 5 typically comprises 5-50 blocks, and preferably 10-25 blocks. Depending on how the region is being modelled, the numerical dispersion from the grid should preferably match the physical dispersion in the rock. If the rock has layers with different properties or varies considerably along its length or cross-section, it may be desirable to increase the number of gridblocks to better describe the geology of the reservoir. The reservoir grid typically comprises hundreds, thousands, tens of thousands of grid blocks or more, depending on the level of detail and accuracy required, the geological complexity of the reservoir, the complexity of the model being executed, timescales and available computing power.

As described above in relation to FIG. 7, the reservoir data from the reservoir model based on the coreflood grid is history-matched against coreflood experiment data, and certain variable parameters (such as the BioWet component value in the case of the STARS model, and the polymer and surfactant components in the case of the REVEAL model) are adjusted as required, to calibrate the model at this coreflood scale. The calibrated model is then "upscaled" and executed on the reservoir grid. Certain static parameters such as fluid volumes and the geographical area/volume must be increased to represent the reservoir scale, while relative values such as concentrations and ratios determined during calibration of the reservoir model at the coreflood scale will directly apply at the reservoir scale.

It can be advantageous to combine two or more reservoir models of different mechanistic complexity. Executing the relatively complex STARS model with a grid having thousands or tens of thousands of grid blocks can take days or weeks to run. By contrast, REVEAL is simpler than STARS in terms of its mechanistics, and enables more realistic geological models, which are a more accurate representation of the reservoir/field scale situation, to be run on such reservoir grids within reasonable runtimes (e.g. hours). REVEAL can, for example, take into account field conditions such as rock formation fracture modelling. STARS incorporates the biomass growth directly using detailed oil release reaction kinetics. In REVEAL, there are no reactions which generate biomass as a function of the injected nutrients; the injected concentrations of polymer and surfactant "pseudo-components" must be chosen to represent the composite effect of inoculating the reservoir and injecting nutrients to grow more biomass and generate interfacially-active products.

Figure 11:
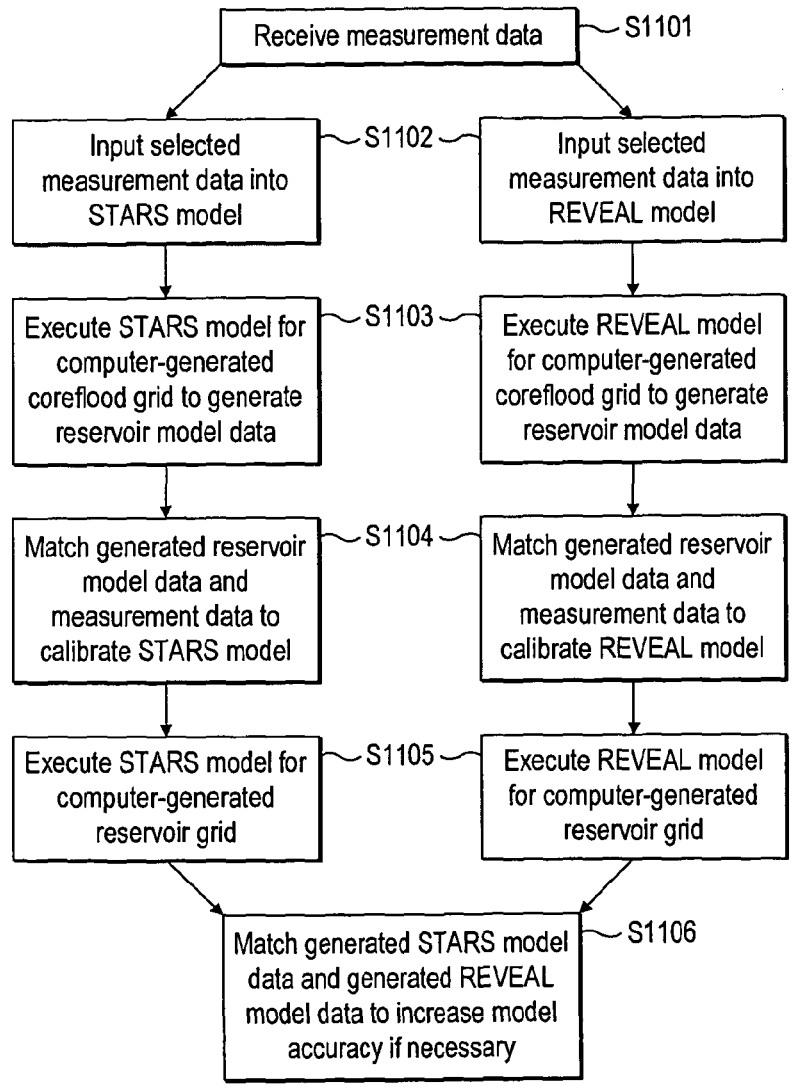
FIG. 11 shows the steps carried out when the computer-implemented models of FIGS. 8 and 9 are both used in predicting the effect of microbes injected into an oil-bearing reservoir, according to the present invention.

The two models, represented by a first reservoir model 611 and a second reservoir model 612 in the processing system 600 of FIG. 6, can be combined to provide a more accurate simulation of the MEOR flood process as will now be described with reference to FIG. 11. As shown in steps S1101-S1104, each of the STARS and REVEAL model is executed independently according to steps S701-S704 of FIG. 7, to provide a calibrated coreflood scale model that is history-matched against dual coreflood experiment measurement data. Each core is approximately 15-30 cm (6-12 inches) and each of the models uses a coreflood grid for the dual coreflood apparatus of a suitable number of grid blocks, for example 20-50 grid blocks. Each of the models is then executed on, for example, an inter-well distance scale model (i.e. based on the distance between an injection well and associated production well, which may be between approximately 60-450 meters (200-1500 feet), which may represent a part of a reservoir or full reservoir. However, the inter-well distance may be as much as several kilometers for some reservoirs.

As mentioned above, the STARS model is relatively complex and therefore takes a far greater amount of computational power and time to run on a reservoir grid having thousands or tens of thousands of grid blocks; therefore, a grid configuration process, in which the number of grid blocks is varied in an attempt to identify a minimum number of grid blocks for which data generated by the models is of sufficient accuracy and detail, is employed. Typically the number of grid blocks is varied between 100 and 1000 during the grid configuration process. In step S1106 the reservoir data from the two models is compared and suitable parameters can be adjusted to match one another if necessary, providing further calibration and verification of the models at the reservoir scale. The parameters compared may be, for example, parameters that indicate the rate of propagation of the MEOR effects and well performance parameters (e.g. rates, pressures, watercuts). This process may be performed manually or automatically by a model comparison component 614 of the processing system 600, and may be carried out for different inter-well distances if appropriate. In the case where the model outputs do not match, given the accuracy of the STARS model, it is likely that the polymer and surfactant component parameters of the REVEAL model will require adjustment in order to increase the accuracy of this model. The re-calibrated REVEAL model can then be used to perform full scale reservoir modelling on finer reservoir grids, for which the STARS model is considered impractical.

It should be understood that the accuracy of each of the STARS and REVEAL reservoir models 611, 612 may be verified upon performing a suitable field trial of an MEOR flood.

The additional or incremental amount of oil that is predicted by the reservoir model 611, 612 or the prediction component 617 is an amount, in terms of, for example, a percentage, fraction or volume, of oil that will be displaced or recovered compared with a predetermined volume of oil, which may be input into the reservoir model 611, 612 or prediction component 617 from the storage component DB1. The predetermined volume of oil may comprise a "base" oil displacement (or recovery) volume, which is determined by running the reservoir model 611, 612 on a computer-generated grid representative of the reservoir 3 to predict the effect on the residual oil saturation in the absence of microbes, or by performing a control waterflood for the dual coreflood apparatus, as described in relation to FIG. 2, and up-scaling this to the reservoir scale as described above in relation to FIG. 7. Alternatively, the predetermined volume of oil can be an amount of oil that has previously been recovered from the reservoir(s) in question; if required, the reservoir model 611, 612 can be used to calculate or estimate the volume of oil displaced based on that recovered (as it is unlikely that 100% of all oil displaced will be recovered during a waterflood), to provide a more accurate comparison with the predicted additional amount of oil displaced.

The system 600 is preferably operatively connected to a controller 616 of the crude oil displacement system, for example via the network N1. The controller 616 of the displacement system is automatically configured with the one or more operating modes determined by the system 600, the controller 616 being arranged to apply the one or more operating modes.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for predicting the effect of microbes injected into an oil-bearing reservoir, the oil-bearing reservoir being capable of being represented by a first computer-generated grid comprising a first plurality of grid blocks, the method comprising the steps of:

receiving measurement data representing the effect of injecting the microbes into a multiple coreflood apparatus, the multiple coreflood apparatus comprising at least first and second material samples indicative of a rock formation associated with said oil-bearing reservoir, said first and second samples being capable of being represented by a second computer-generated grid comprising a second plurality of grid blocks, the first and second samples being representative of different regions of the reservoir and being connected such that microbes injected into the first sample are able to flow to the second sample;

inputting selected data of the received measurement data into a computer-implemented reservoir model configured to simulate said effect of microbe injection in relation to the second grid;

executing the reservoir model to generate reservoir model data indicative of the effect of injecting the microbes into the multiple coreflood apparatus;

adjusting parameters of the reservoir model by matching the reservoir model data against the measurement data, in order to calibrate the reservoir model; and executing the calibrated reservoir model for the first grid to predict the effect of injecting the microbes into the reservoir.

2. A method according to claim 1, wherein predicting the effect of injecting the microbes into the reservoir comprises modelling at least one of changes in rock permeability, changes in fluid properties and/or changes in wettability owing to microbial activity.

3. A method according to claim 1, wherein the reservoir model data generated by the reservoir model is indicative of the kinetics of oil release resulting from injecting the microbes, the reservoir model comprising a plurality of algorithms that are configured based on at least:

chemical properties of oil, water, microbes and associated nutrients present in the reservoir;

a first chemical component representative of binding components of the oil to the surface of the rock formation;

a second chemical component representative of the interfacial activity of the microbes;

a third chemical component representative of the presence of microbes absorbed onto the rock formation; and relative permeability data.

4. A method according to claim 3, wherein the relative permeability data used to configure each of the second grid of the reservoir model is dependent on a concentration of the first chemical component.

5. A method according to claim 1, wherein the reservoir model comprises a plurality of algorithms that are configured based on at least components representing:

an oil component representative of properties of oil present in the reservoir;

a water component representative of water present in the reservoir;

a gas component representative of gas present in the reservoir;

a polymer flood component configured to represent the presence of biomass generated by the microbes; and a surfactant component configured to represent the presence of interfacially active properties of the microbes.

6. A method according to claim 5, wherein relative permeability data used to configure the second grid of the reservoir model is dependent on an adsorption factor of the surfactant component.

7. A method according to claim 5, wherein any change in permeability in a grid block of the reservoir model is dependent on an adsorption factor of the polymer component.

8. A method according to claim 1, wherein, when matching the reservoir model data against the measurement data, in order to calibrate the computer-implemented reservoir model configured to simulate said effect of microbe injection in relation to the second grid, parameters compared comprise one or more of a microbe population count, a differential pressure measurement, water saturation, oil saturation, chemical analysis of an injection fluid associated with the injection of microbes, data relating to the kinetics of interfacial activity of the microbes, and data relating to the kinetics of nutrients injected into the multiple coreflood apparatus.

9. A method according to claim 1, wherein the reservoir model is a first reservoir model that generates a first set of reservoir model data, the method further comprising:

inputting selected data of the received measurement data into a second computer-implemented reservoir model configured to simulate said effect of microbe injection in relation to the second grid;

executing the second reservoir model to generate a second set of reservoir model data indicative of the effect of injecting the microbes into the multiple coreflood apparatus;

adjusting parameters of the second reservoir model by matching the second set of reservoir model data against the measurement data, in order to calibrate the second reservoir model;

executing the calibrated second reservoir model for the first grid to predict the effect of injecting the microbes into the reservoir; and adjusting parameters of the first or second reservoir models by comparing and matching data generated by each model when the models are executed for the first grid, in order to increase the accuracy of one or both of the models.

10. A method according to claim 1, further comprising the step of executing a prediction software component so as to generate predicted data indicative of a predicted additional amount of oil, compared with a predetermined volume of oil, which will be displaced by configuring a crude oil displacement system so as to inject said microbes into the reservoir.

11. A method according to claim 10, further comprising the step of determining, on the basis of the predicted data, one or more operating modes of the crude oil displacement system.

12. A non-transitory computer readable medium comprising a computer program, or a suite of computer programs, comprising a set of instructions arranged to cause a computer, or a suite of computers, to perform the steps according to claim 1.

13. A system for predicting the effect of microbes injected into an oil-bearing reservoir, the oil-bearing reservoir being capable of being represented by a first computer-generated grid comprising a first plurality of grid blocks, the system comprising:

data receiving means arranged to receive measurement data representing the effect of injecting the microbes into a multiple coreflood apparatus, the multiple coreflood apparatus comprising at least first and second material samples indicative of a rock formation associated with said oil-bearing reservoir, and being capable of being represented by a second computer-generated grid comprising a second plurality of grid blocks, the first and second samples being representative of different regions of the reservoir and being connected such that microbes injected into the first sample are able to flow to the second sample;

a computer-implemented reservoir model configured to simulate said effect of microbe injection in relation to the second grid based on selected data of the received measurement data, and arranged to generate reservoir model data indicative of the effect of injecting the microbes into the multiple coreflood apparatus;

calibration means arranged to adjust parameters of the reservoir model by matching the reservoir model data against the measurement data, in order to calibrate the reservoir model, the calibrated model being configured to simulate said effect of microbe injection in relation to the first grid and to thereby predict the effect of injecting the microbes into the reservoir.

14. A system according to claim 13, wherein the reservoir model is arranged to model at least one of changes in rock permeability, changes in fluid properties and/or changes in wettability owing to microbial activity.

15. A system according to claim 13, wherein the reservoir model is arranged to generate reservoir model data indicative of the kinetics of oil release resulting from injecting the microbes, the reservoir model comprising a plurality of algorithms that are configured based on at least:
- chemical properties of oil, water, microbes and associated nutrients present in the reservoir;
- a first chemical component representative of binding components of the oil to the surface of the rock formation;
- a second chemical component representative of the interfacial activity of the microbes;
- a third chemical component representative of the presence of microbes absorbed onto the rock formation; and
- relative permeability data.

16. A system according to claim 15, wherein the relative permeability data used to configure each of the second grid of the reservoir model is dependent on a concentration of the first chemical component.

17. A system according to claim 13, wherein the reservoir model comprises a plurality of algorithms that are configured based on at least components representing:
- an oil component representative of properties of oil present in the reservoir;
- a water component representative of water present in the reservoir;
- a gas component representative of gas present in the reservoir;
- a polymer food component configured to represent the presence of biomass generated by the microbes; and
- a surfactant component configured to represent the presence of interfacially active properties of the microbes.

18. A system according to claim 17, wherein relative permeability data used to configure the second grid of the reservoir model is dependent on an adsorption factor of the surfactant component.

19. A system according to claim 17, wherein any change in permeability in a grid block of the reservoir model is dependent on an adsorption factor of the polymer component.

20. A system according to claim 13, wherein, when matching the reservoir model data against the measurement data in order to calibrate the computer-implemented reservoir model configured to simulate said effect of microbe injection in relation to the second grid, the calibration means compares one or more of a microbe population count, a differential pressure measurement, water saturation, oil saturation, chemical analysis of an injection fluid associated with the injection of microbes, data relating to the kinetics of interfacial activity of the microbes, and data relating to the kinetics of nutrients injected into the multiple coreflood apparatus.

21. A system according to claim 13, wherein the reservoir model is first reservoir model that generates a first set of reservoir model data, the method further comprising:
- a second computer-implemented reservoir model configured to simulate said effect of microbe injection in relation to the second grid, and arranged to generate a second set of reservoir model data indicative of the effect of injecting the microbes into the multiple coreflood apparatus;
- wherein said calibration means is arranged to adjust parameters of the second reservoir model by matching the second set of reservoir model data against the measurement data, in order to calibrate the second reservoir model, the calibrated second reservoir model being configured to simulate said effect of microbe injection in relation to the first grid and to thereby predict the effect of injecting the microbes into the reservoir,
- wherein the system further comprises a model comparison component arranged to adjusting parameters of the first or second reservoir models by comparing and matching data generated by each model when the models are executed for the first grid, in order to increase the accuracy of one or both of the models.

22. A system according to claim 13, further comprising a prediction software component arranged to generate predicted data indicative of a predicted additional amount of oil, compared with a predetermined volume of oil, which will be displaced by configuring a crude oil displacement system so as to inject said microbes into the reservoir.

23. A system according to claim 22, further comprising means for determining, on the basis of the predicted data, one or more operating modes of the crude oil displacement system.

* * * * *